United States Patent
Cai

(10) Patent No.: US 9,241,079 B1
(45) Date of Patent: Jan. 19, 2016

(54) MOBILE APPLICATION USAGE MONITOR

(71) Applicant: Danqing Cai, Singapore (SG)

(72) Inventor: Danqing Cai, Singapore (SG)

(73) Assignee: SAP SE, Walldorf (DE)

(*) Notice: Subject to any disclaimer, the term of this patent is extended or adjusted under 35 U.S.C. 154(b) by 29 days.

(21) Appl. No.: 14/316,814

(22) Filed: Jun. 27, 2014

(51) Int. Cl.
*H04M 11/00* (2006.01)
*H04M 15/00* (2006.01)

(52) U.S. Cl.
CPC .......... *H04M 15/885* (2013.01); *H04M 15/853* (2013.01)

(58) Field of Classification Search
CPC ................ H04M 15/885; H04M 15/853
USPC ........................................................ 455/405
See application file for complete search history.

(56) References Cited

U.S. PATENT DOCUMENTS

| | | | |
|---|---|---|---|
| 6,678,824 B1 * | 1/2004 | Cannon | A63F 13/10 705/59 |
| 7,868,733 B2 * | 1/2011 | Rhelimi | G07C 9/00087 340/5.2 |
| 8,731,577 B2 * | 5/2014 | Bai | H04W 48/18 455/452.2 |
| 8,923,994 B2 * | 12/2014 | Laikari | A61B 5/1112 482/2 |
| 9,104,313 B2 * | 8/2015 | Sivaraman | G06F 3/0219 |
| 2013/0080522 A1 * | 3/2013 | Ren | H04L 12/6418 709/204 |
| 2014/0062676 A1 * | 3/2014 | Liu | G08C 17/02 340/12.5 |
| 2014/0115682 A1 * | 4/2014 | He | G06F 21/316 726/7 |
| 2015/0006446 A1 * | 1/2015 | Chiba | A61B 5/1123 706/12 |
| 2015/0007350 A1 * | 1/2015 | Gudipati | G06F 21/54 726/30 |

* cited by examiner

Primary Examiner — Amancio Gonzalez

(74) Attorney, Agent, or Firm — Horizon IP Pte Ltd

(57) ABSTRACT

Described herein is a framework to monitor mobile application usage. In accordance with one aspect of the framework, sensor data from one or more sensors in a mobile computing device is received. Usage of one or more mobile applications implemented on the mobile computing device may be monitored based on such sensor data to generate monitoring results. A report may be generated based on the monitoring results.

20 Claims, 3 Drawing Sheets

US 9,241,079 B1

MOBILE APPLICATION USAGE MONITOR

TECHNICAL FIELD

The present disclosure relates generally to computer systems, and more specifically, to a framework for mobile application usage monitoring.

BACKGROUND

Mobile applications software (or "apps") designed to operate on smartphones, tablet computers and other mobile devices have become increasingly popular. Mobile applications are offered to not only enhance general productivity and retrieve information (e.g., email, calendar, contact information, stock market, weather information, traffic information, location, news, magazines, etc.), they can also be used for entertainment (e.g., mobile games, songs and video players, etc.), banking, purchasing goods and services (e.g., concert tickets), communication (e.g., social networking, messaging, etc.) and many other areas.

With the explosion in the number and variety of mobile applications, people are spending more time using mobile applications on their mobile devices. According to a report released by Flurry Analytics that tracked app usage of a pool of 300,000 apps on over a billion active mobile devices, people spend an average of 158 minutes each day on their smartphones and tablets. Excessive use of mobile apps may create numerous health hazards, including eye strain, neck pain, headaches, sleeplessness, lack of sleep, rest and/or exercise, lack of prolonged attention, increased level of procrastination, and other associated problems.

Frequent and abundant updates from social media applications are particularly notorious in distracting people from engaging in work, study or otherwise productive activities. Concerns over screen addiction have attracted attention from various health authorities and researchers. The Menthal project from the University of Bonn, for example, is an ongoing effort to promote more sustainable digital lifestyle.

SUMMARY

A framework for monitoring usage of mobile applications is described herein. In accordance with one aspect of the framework, sensor data from one or more sensors in a mobile computing device is received. Usage of one or more mobile applications implemented on the mobile computing device may be monitored based on such sensor data to generate monitoring results. A report may be generated based on the monitoring results.

In accordance with another aspect, usage time of one or more mobile applications is determined based on sensor data received from one or more sensors in a mobile computing device. In response to the usage time exceeding a pre-defined time quota setting, an alert message may be generated.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance A framework for mobile application usage monitoring is described herein. One aspect of the present framework monitors the length and/or distribution of usage (or activation) time of mobile applications to provide individual users with better time control and lifestyle management. In some implementations, a user may allocate a daily time quota (e.g., 60 minutes) for mobile application usage. The framework then monitors the mobile application usage and alerts the user in response to the quota being exceeded. To monitor the mobile application usage, the framework may perform a recognition algorithm on sensor data (e.g., images, video, etc.) acquired by the mobile device to detect the user looking at the screen of the mobile device, the type of mobile application being used and/or the duration of usage time.

Such features advantageously overcome the privacy restrictions imposed by certain mobile device manufacturers (e.g., Apple) that disallow tracking of individual app activation. In addition, unlike parental control applications that enable parents to restrict certain applications from being accessed by underage children, the present framework does not require the user to specify the specific applications being monitored or restrict access to such applications. By alerting users of over-usage of their mobile apps, the society in general may enjoy a better quality of life. Anonymized usage data may also be collected from various mobile devices and distributed to health authorities to facilitate adoption of evidence-based health promotion methods and to influence their policy design. The framework also provides a business model to support it via advertising channels for business users to promote themselves and reach end-users.

It should be appreciated that the framework described herein may be implemented as a method, a computer-controlled apparatus, a computer process, a computing system, or as an article of manufacture such as a computer-usable medium. These and various other features and advantages will be apparent from the following description.

Figure 1:
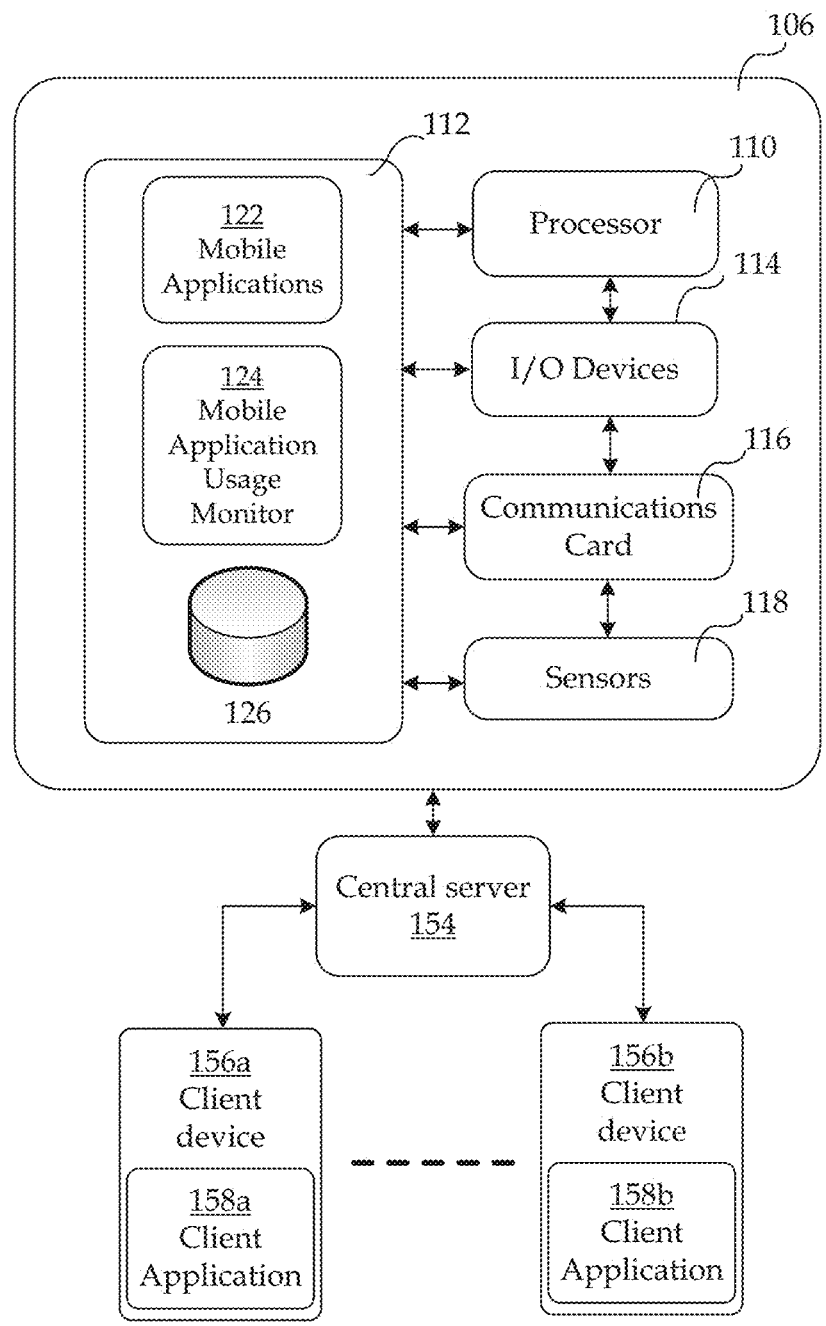
FIG. 1 is a block diagram illustrating an exemplary architecture.

FIG. 1 is a block diagram illustrating an exemplary architecture 100 in accordance with one aspect of the present framework. Generally, exemplary architecture 100 may include a mobile computing device 106, a central server 154 and one or more client devices 156a-b.

Mobile computing device 106 can be any type of computing device that is expected to be transported during normal usage. Mobile computing device 106 is capable of responding to and executing instructions in a defined manner, such as a portable laptop computer, a smartphone, a tablet computer, a personal digital assistant (or enterprise digital assistant), an ultra-mobile personal computer, a wearable computer, a cellular device, a mobile phone, a gaming device, a portable media player, a wireless device, a data browsing device, and so forth. Mobile computing device 106 may include a processor 110, input/output (I/O) devices 114 (e.g., touch screen, keypad, touch pad, display screen, speaker, etc.), a memory module 112, a communications card or device 116 (e.g., modem and/or network adapter) for exchanging data with a network (e.g., local area network or LAN, wide area network (WAN), Internet, etc.) and sensors 118 (e.g., front-facing camera, battery power consumption sensor, microphone, motion sensor, GPS receiver, etc.). It should be appreciated that the different components and sub-components of the mobile computing device 106 may be located or executed on different machines or systems. For example, a component may be executed on many computer systems connected via the network at the same time (i.e., cloud computing).

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks or cards, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor 110. As such, mobile computing device 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 includes one or more mobile applications. Mobile applications (or apps) 122 are software applications implemented on mobile devices. Mobile applications 122 may facilitate productive activities (e.g., work-related activities, academic activities, etc.) that the user may desire to encourage, and/or entertainment activities (e.g., game playing, video watching, social messaging, reading magazines, web browsing, etc.) that a user may desire to limit or restrict. Other types of activities may also be facilitated. Memory module 112 may further include components, such as mobile application usage monitor 124 and database 126, for monitoring usage of such mobile applications 122 by an individual user. Database 126 may include, for example, sensor data (e.g., images or videos) acquired by sensors 118 that may be used to automatically detect usage of the mobile applications 122.

Mobile computing device 106 may operate in a networked environment using logical connections to a central server 154.

The central server 154 may serve to collect, process and store mobile application usage-related data from the mobile computing device 106 and other mobile computing devices (not shown). The central server 154 may distribute such usage-related information to one or more client devices 156a-b. Such client devices 156a-b may include client applications 158a-b configured to present a user interface (e.g., graphical user interface) to access the usage-related information and services, including services provided by central server 154. The client devices 156a-b may be associated with, for example, health authorities, commercial sponsors, organizations, and so forth.

Figure 2:
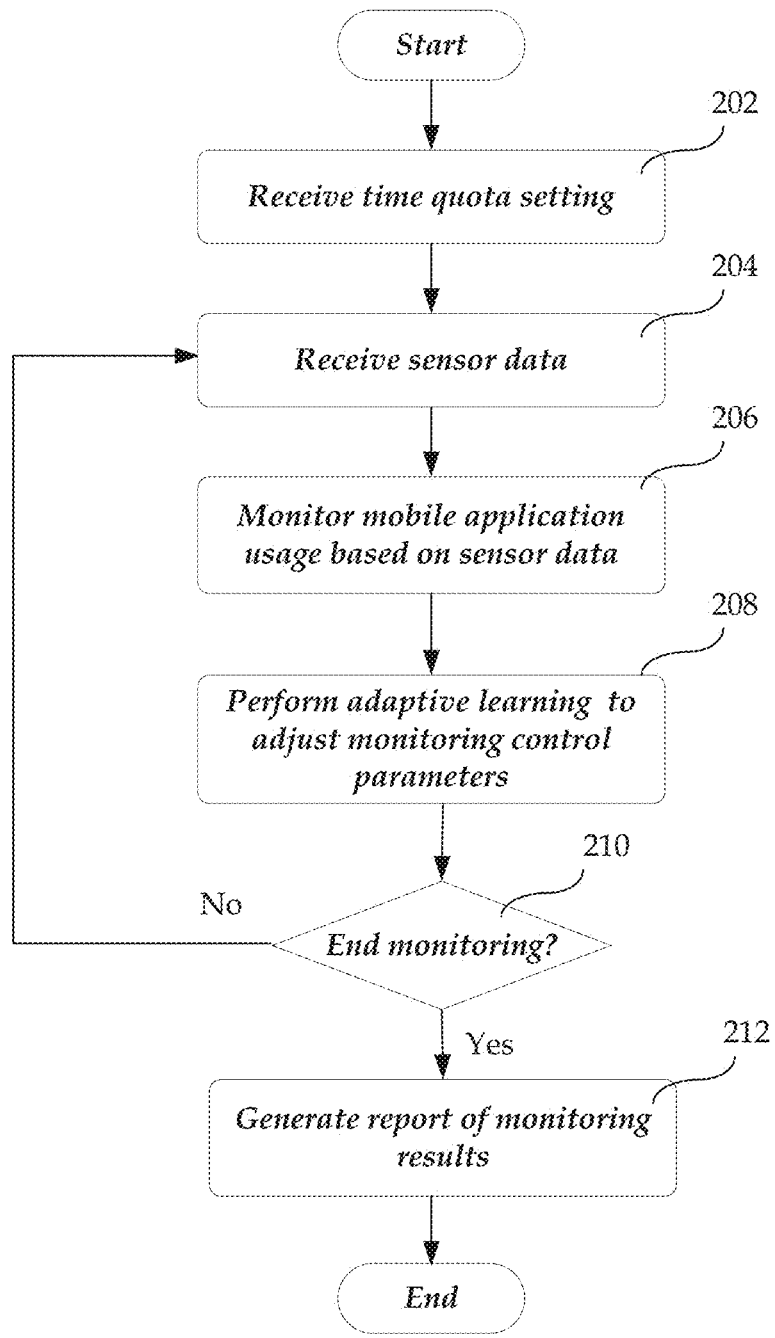
FIG. 2 shows an exemplary method for monitoring mobile application usage.

FIG. 2 shows an exemplary method 200 for monitoring mobile application usage. The method 200 may be performed automatically or semi-automatically by the system 100, as previously described with reference to FIG. 1. It should be noted that in the following discussion, reference will be made, using like numerals, to the features described in FIG. 1.

At 202, mobile application usage monitor 124 receives a time quota setting from the user. The user may set the time quota via, for example, a user interface displayed on the mobile computing device 106. The user may allocate, for example, a daily activation quota (e.g., 60 minutes) on all mobile applications. Different quotas may be set for different types of applications (e.g., browsing applications, chatting/gaming applications, others, etc.). In response to receiving the time quota setting, the mobile application usage monitor 124 may activate or cause one or more sensors 118 to be activated so as to acquire sensor data.

At 204, mobile application usage monitor 124 receives sensor data from one or more sensors 118. In some implementations, image data (or digital video frames) is received from a front facing camera 118. Other types of sensor data, such as battery power consumption data, audio data, motion data, location data, biometric sensor data, etc., may also be received. In addition, the mobile application usage monitor 124 may further receive user input via, for example, mobile application 122, of biometric and/or personal information, such as age, gender, address, etc., as part of a user profile registration process.

At 206, mobile application usage monitor 124 monitors mobile application usage based on the sensor data. In some implementations, mobile application usage monitor 124 determines the usage time duration of all types of mobile applications. In other implementations, mobile application usage monitor 124 determines the type of applications being used, and the usage time duration for each type of application.

Figure 3:
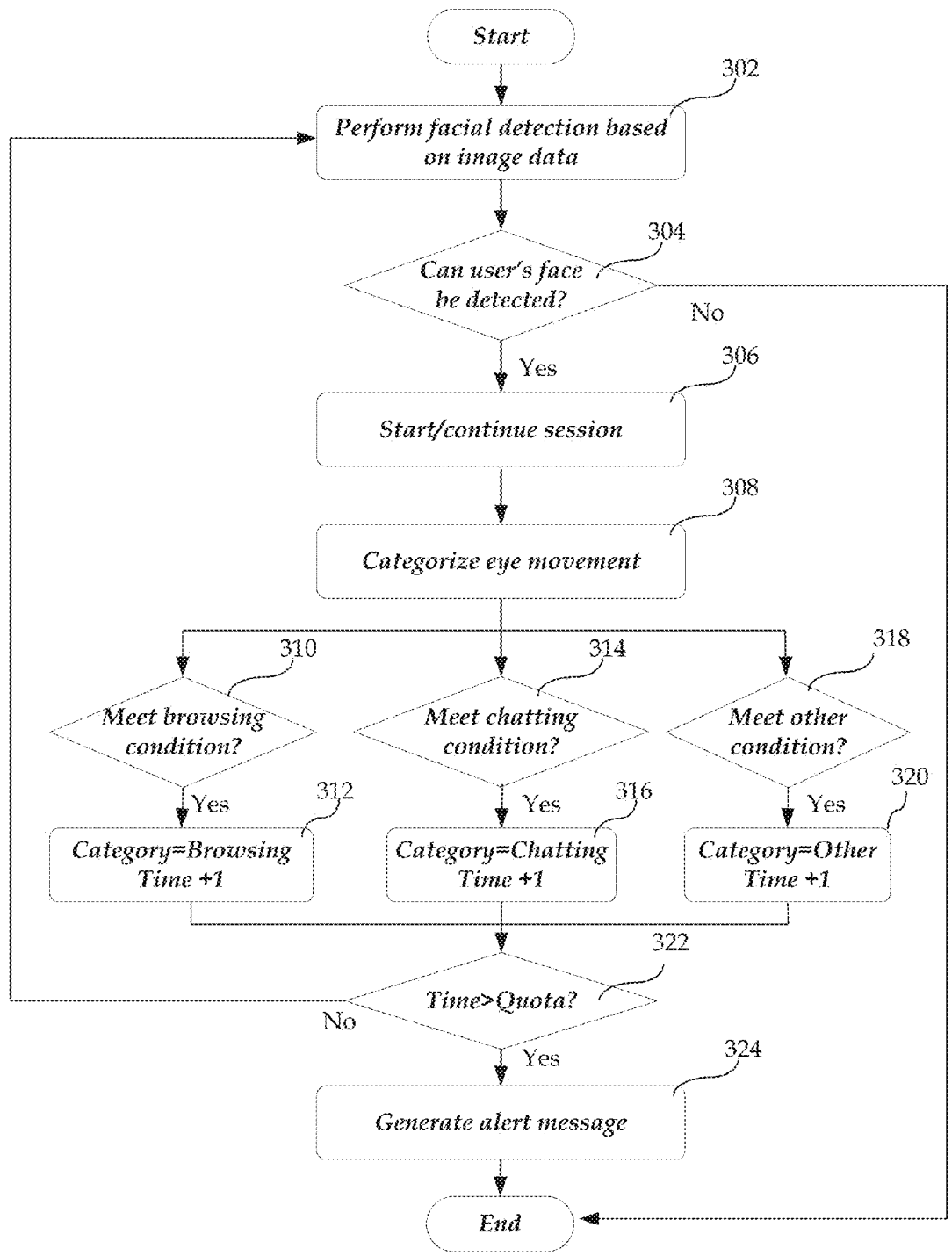
FIG. 3 show an exemplary method of monitoring mobile application usage based on image data.

FIG. 3 show an exemplary method 206 of monitoring mobile application usage based on image data. Although the method 206 is described in the context of image data for illustration purposes, other types of sensor data may alternatively or additionally be used. For example, an increase in battery power consumption may be used to detect usage of additional mobile applications. Other types of sensor data and determinations are also possible.

Referring to FIG. 3, at 302, mobile application usage monitor 124 performs a facial recognition algorithm to detect the user's face in the image data. In some implementations, a specific user's face is detected. The facial recognition algorithm extracts landmarks (or features) from an image, and uses these features to search for other images with matching features. Exemplary facial recognition algorithms include, but are not limited to, Principal Component Analysis (PCA), Linear Discrimate Analysis, Elastic Bunch Graph Matching, Hidden Markov model, Multilinear Subspace Learning, neuronal motivated dynamic link matching, skin texture analysis, and so forth. Other facial recognition algorithms are also useful.

At 304, mobile application usage monitor 124 determines if the user's face has been detected. If not, the method 206 terminates. If the user's face has been detected, the method 206 continues at 306.

At 306, mobile application usage monitor 124 starts a new session or continues a previous session.

At 308, mobile application usage monitor 124 categorizes eye movement (or facial expression) of the detected face. Eye movement (or facial expression) may be compared to a baseline of normal eye movements to detect the type of mobile application being used. In some implementations, the eye movement may indicate whether a browsing mobile application, a chatting mobile application (e.g., Facebook, Twitter, WhatsApp, other messaging or social networking application, etc.), or any other category or type of application, is used. In response to categorizing the type of eye movement or mobile application being used, the usage time duration ("Time") may be updated. Different usage time durations may be updated for different categories or types of applications. The usage time duration ("Time") may be reset daily, or at any other predefined interval (e.g., weekly, monthly, etc.).

At 310, mobile application usage monitor 124 checks to see if the browsing condition is met. A browsing condition may be met if, for example, the eye movement of the user is left to right and diagonally downwards. At 312, in response to the browsing condition being met, the category of eye movement is set to "Browsing" and the usage time duration ("Time") is increased by, for example, one.

At 314, mobile application usage monitor 124 checks to see if the chatting condition is met. A chatting condition may be met if the eye movement of the user is relatively stationary. At 316, in response to the chatting condition being met, the category of eye movement is set to "Chatting" and the usage time duration ("Time") is increased by, for example, one.

At 318, mobile application usage monitor 124 checks to see if other condition is met. Other conditions may include, for example, other patterns of eye movements. At 320, in response to other condition being met, the category of eye movement is set to "Other" (or the respective condition), and the usage time duration ("Time") is increased by, for example, one.

At 322, mobile application usage monitor 124 determines if the usage time duration ("Time") is greater than (or substantially close to) the time quota setting. If not, mobile application usage monitor 124 continues at 302 to process the next set of image data received from sensors 118. If yes, the method 206 continues at 324.

At 324, in response to the usage time duration exceeding the time quota setting, an alert message is generated and presented via an output device 114 (e.g., display, speaker, etc.) on mobile computing device 106. The alert message may be presented one time, or repeatedly at predetermined or user-configurable time intervals (e.g., every 5 minutes). The alert message may notify the user that the time quota setting is exceeded, or is substantially close to being exceeded. For example, the alert message may notify the user that the time quota is almost used up (e.g., "95% of your time quota is used"). The mobile application usage monitor 124 may notify the user, but does not prevent the user from overusing the quota by restricting access to the mobile application.

In some implementations, the alert message includes a name of a commercial sponsor. Business users may manage alert rules via client applications 158a-b implemented on client devices 156a-b. For example, business users such as commercial sponsors may customize the alert message by adding their business names or promotional messages to the alert message (e.g., "Gym4U reminds you to put aside your phone and exercise more."). Other types of alert rules are also possible. After the alert message is generated, the current session ends.

Returning to FIG. 2, at 208, mobile application usage monitor 124 performs adaptive learning to adjust monitoring control parameters. The mobile application usage monitor 124 may use manual verification of the results from the session to perform the adaptive learning. Monitoring control parameters that may be adjusted include, but are not limited to, eye movement pattern definitions, time quota setting, monitoring length of time, etc. Such monitoring control parameters are used to control the next session of monitoring.

At 210, mobile application usage monitor 124 determines if monitoring should continue. If yes, steps 204 to 208 are repeated to process new sensor data received. If no, the method 200 continues to step 212.

At 212, mobile application usage monitor 124 generates a report based on the monitoring results. The report may provide information about the usage time and distribution of mobile application usage. In some implementations, the report summarizes the actual usage time spent on the mobile applications, and presents the usage time durations in a trend chart with scores or points for the user. Mobile application usage monitor 124 may enable the user to share the report (e.g., trend chart) with friends or other users.

In some implementations, central server 154 may collect the report from one or more mobile computing devices 106 for analysis. For example, central server 154 may compile anonymized statistics of groups of users based on the reports. Such anonymized statistics do not provide any user-identifying information, such as name, social security number, etc., so as to protect the privacy of the users. Each group of users share similar user profile attributes (e.g., gender, age group, geographical location, profession, education, income group, etc.). Such user profile attributes may be declared by the user to be publicly shared. The anonymized group statistics may be reused by health authorities or any other interested organizations. In some implementations, the central server 154 distributes the statistics or aggregated reports to client devices 156a-b.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:
1. A mobile computing device, comprising:
one or more sensors configured to acquire sensor data of a user;
a non-transitory memory device for storing one or more mobile applications and computer-readable program code; and
a processor in communication with the memory device, the processor being operative with the computer-readable program code to
receive the sensor data from the one or more sensors,
determine usage time of the one or more mobile applications based on the sensor data, and
in response to the usage time exceeding a pre-defined time quota setting, generate an alert message.

2. The device of claim 1 wherein the sensor data comprises image data, and the one or more sensors comprise a front-facing camera.

3. The device of claim 1 wherein the pre-defined time quota setting comprises a daily time quota.

4. The device of claim 1 wherein the processor is operative with the computer-readable program code to determine the usage time by performing a facial recognition algorithm to detect a user's face in the sensor data.

5. The device of claim 4 wherein the processor is further operative with the computer-readable program code to categorize eye movement of the detected user to determine a type of the one or more mobile applications being used.

6. A method of monitoring mobile application usage, comprising:
   receiving sensor data from one or more sensors in a mobile computing device;
   monitoring, based on the sensor data, usage of one or more mobile applications implemented on the mobile computing device to generate monitoring results; and
   generating a report based on the monitoring results.

7. The method of claim 6 wherein receiving the sensor data from the one or more sensors comprises receiving image data from a camera.

8. The method of claim 6 wherein receiving the sensor data from the one or more sensors comprises receiving battery power consumption data from a battery power consumption sensor.

9. The method of claim 6 wherein receiving the sensor data from the one or more sensors comprises receiving motion data from a motion sensor.

10. The method of claim 6 wherein monitoring usage of the one or more mobile applications implemented on the mobile computing device comprises determining a usage time.

11. The method of claim 10 further comprising:
   receiving, via a user interface, a time quota setting; and
   in response to the usage time exceeding the time quota setting, generating an alert message.

12. The method of claim 11 wherein generating the alert message comprises presenting the alert message repeatedly at predefined time intervals.

13. The method of claim 11 wherein generating the alert message comprises generating the alert message in accordance with an alert rule managed, via a client device, by a business user.

14. The method of claim 11 wherein the alert message comprises a name of a commercial sponsor.

15. The method of claim 10 wherein generating the report based on the monitoring results comprises summarizing the usage time in a trend chart.

16. The method of claim 6 wherein monitoring usage of the one or more mobile applications implemented on the mobile computing device comprises performing a facial recognition algorithm to detect a user's face in the sensor data.

17. The method of claim 16 further comprising in response to detecting the user's face in the sensor data, categorizing eye movement of the user to determine a type of the one or more mobile applications being used.

18. The method of claim 6 further comprising performing adaptive learning to adjust monitoring control parameters.

19. The method of claim 6 further comprising:
   compiling, by a server coupled to the mobile computing device, anonymized statistics based at least in part on the report.

20. A non-transitory computer-readable medium having stored thereon program code, the program code executable by a computer to perform steps comprising:
   receiving sensor data from one or more sensors of a mobile computing device;
   monitoring, based on the sensor data, usage of one or more mobile applications implemented on the mobile computing device to generate monitoring results; and
   generating a report based on the monitoring results.

* * * * *